United States Patent [19]

Okita

[11] Patent Number: 4,952,435
[45] Date of Patent: Aug. 28, 1990

[54] ADHESIVE FOR A BASE-MOUNTED FLEXIBLE MAGNETIC DISC

[75] Inventor: Tsutomu Okita, Kanagawa, Japan

[73] Assignee: Fuji Photo Film Co., Ltd., Kanagawa, Japan

[21] Appl. No.: 914,958

[22] Filed: Oct. 3, 1986

[30] Foreign Application Priority Data

Oct. 3, 1985 [JP] Japan ............................. 60-221031
Oct. 3, 1985 [JP] Japan ............................. 60-221032

[51] Int. Cl.⁵ ............................................. G11B 25/00
[52] U.S. Cl. ............................................. 428/64; 427/132; 428/694; 428/900
[58] Field of Search ................... 427/132; 428/64, 694, 428/900

[56] References Cited

U.S. PATENT DOCUMENTS

| | | | |
|---|---|---|---|
| 3,373,413 | 3/1968 | Treseder | 340/174.1 |
| 3,446,156 | 9/1969 | Peters | 427/132 |
| 3,537,083 | 10/1970 | Voth | 340/174.1 |
| 3,599,226 | 8/1971 | Lips | 346/74 |
| 3,681,225 | 8/1972 | Genma | 427/132 |
| 3,737,880 | 6/1973 | Kelley | 340/174 |
| 3,805,292 | 4/1974 | Hashiguchi et al. | 360/135 |
| 4,239,828 | 12/1980 | Knope | 428/64 |
| 4,365,257 | 12/1982 | Gerfast | 346/135.1 |
| 4,376,963 | 3/1983 | Knoop et al. | 360/135 |
| 4,387,114 | 6/1983 | Conner | 427/54.1 |
| 4,504,842 | 3/1985 | Odawara | 346/137 |
| 4,539,220 | 9/1985 | Martinelli | 428/900 |
| 4,555,716 | 11/1985 | Odawara | 346/137 |
| 4,573,097 | 2/1986 | Pastor et al. | 360/135 |
| 4,578,299 | 3/1986 | Kato | 428/64 |
| 4,609,964 | 9/1986 | Sobel | 428/64 |
| 4,623,570 | 11/1986 | Alexander | 428/65 |
| 4,631,609 | 12/1986 | Erickson et al. | 360/135 |
| 4,647,473 | 3/1987 | Kato | 428/64 |
| 4,652,480 | 3/1987 | Kato | 428/65 |
| 4,671,978 | 6/1987 | Kato | 428/64 |
| 4,704,179 | 11/1987 | Yamamoto | 428/65 |
| 4,742,420 | 5/1988 | Oishi | 428/63 |
| 4,742,421 | 5/1988 | Seto | 428/65 |

FOREIGN PATENT DOCUMENTS 60115023 9/1984 Japan.
938095 9/1963 United Kingdom.
1005103 9/1965 United Kingdom.

Primary Examiner—Paul J. Thibodeau
Attorney, Agent, or Firm—Sughrue, Mion, Zinn, Macpeak & Seas

[57] ABSTRACT

A magnetic disk in which a flexible non-magnetic sheet support has a magnetic layer formed on one side and its other side is bonded to mounting rings formed on a base such that a gap is formed between the support and the base. A non-solvent type adhesive is used for the bonding, such as, a hot-melt rubber resin or a radiation cured acryl or rubber adhesive.

13 Claims, 1 Drawing Sheet

ADHESIVE FOR A BASE-MOUNTED FLEXIBLE MAGNETIC DISC

BACKGROUND OF THE INVENTION

1. Field of the Invention

The present invention relates to a method of manufacturing a magnetic disk for use in magnetic recording.

2. Background Art

Heretofore, a rigid magnetic disk has been used as one kind of magnetic disk. A rigid material having little flexibility has been used for the base of the magnetic disk. Generally, aluminum (for example, JIS A5086) has been used for the base of the rigid magnetic disk.

Such a rigid disk is generally produced by the following method. An aluminum disk is machined by a lathe and then its surface is ground so that it is possible to perform high-density recording with a reduced space between a head and the disk. Thereafter, a magnetic layer is formed on the disk by evaporating, spin coating, or the like. In this case, it is preferable that the surface of the disk is made as smooth as possible for the purpose of high-density recording/reproducing. In the conventional aluminum base disk, it is however difficult to obtain a surface having a center line average roughness Ra of not more than 0.1 micrometer. Further, when the magnetic layer is formed, there is such a limitation that webs cannot be applied continuously because of lack of flexibility of the base. Furthermore, since dust deposited on the surface has a great influence on high-density recording, the disk must be produced so as to be free from dust. Accordingly, the manufacturing process which requires much time is made more troublesome and more complex, resulting in the requirement of a large investment in equipment.

The conventional base is rigid and therefore inflexible as typified in an aluminum base. Accordingly, it is necessary to require that the head not come in contact with the magnetic layer of the disk when the head is tracing the magnetic layer. It is however difficult to maintain a constant narrow space between the head and the disk, so that error signals are often produced. Accordingly, it is very difficult to further reduce the space between the head and the surface of the disk in order to further increase the recording density. On the other hand, if the head accidentally touches the surface of the disk when the head is tracing the magnetic layer with such a narrow space between the head and the magnetic layer, a large impact force is likely to be concentrated at the contacting point of the magnetic layer because of the rigidity of the base so as to fracture the surface to thereby shorten the life of the disk.

There is such a further disadvantage that the aluminum base polished as described above is expensive.

To avoid the defects, recently, there has been proposed a magnetic disk arranged such that wide annular grooves are formed in opposite surfaces of a disk base. Two floppy disks or flexible disks (hereinafter generally referred to as "flexible disk sheets"), each having a magnetic layer on one of its surfaces are bonded on the disk base with the respective magnetic layers on the outside. As a result, a gap is maintained between the disk base and the rear surface of each of the flexible disk sheets.

The magnetic recording surfaces of the magnetic disk of this type is flexible, so that if a head accidentally touches the magnetic recording surface or even in the case where a head is intentionally caused to touch the magnetic recording surface to perform higher-density recording, the magnetic layer is hardly affected unlike the case of the rigid disk. Accordingly, the technique of flexible disks is applicable as it is. A durable magnetic layer having a smooth surface can be utilized as a magnetic layer for the magnetic disk of this type. Accordingly, the magnetic disk of this type has attracted special interest in that the defects of the conventional rigid magnetic disk can be avoided.

SUMMARY OF THE INVENTION

A first object of the present invention is to provide a magnetic disk in which the base and the flexible disk cannot be separated from each other at their common bond surface due to aging or chemical transformations.

A second object of the invention is to provide a magnetic disk in which quick adhesion can be accomplished.

A third object of the invention is to provide a magnetic disk in which the flexible disk is tensioned.

The foregoing objects of the present invention are attained by a magnetic disk in which a flexible disk has a magnetic layer on one surface of a non-magnetic support and is affixed onto at a surface of a base with a gap between the non-magnetic surface of the flexible disk and a recess in the base. A non-solvent type adhesive agent is used as an adhesive agent for fixing the support to the base.

DETAILED DESCRIPTION OF THE PREFERRED EMBODIMENTS

The present invention will be described in detail hereinafter.

Figure 1:
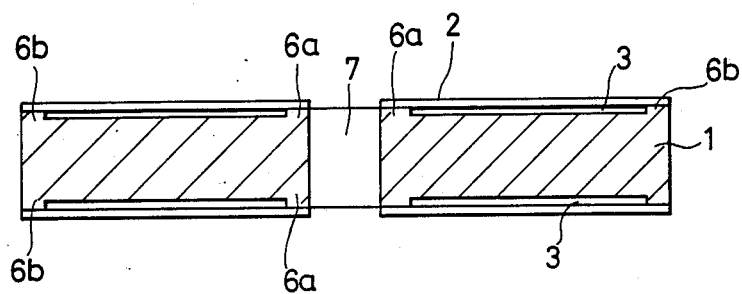
FIG. 1 is a sectional view of the magnetic disk according to the present invention.
Figure 2:
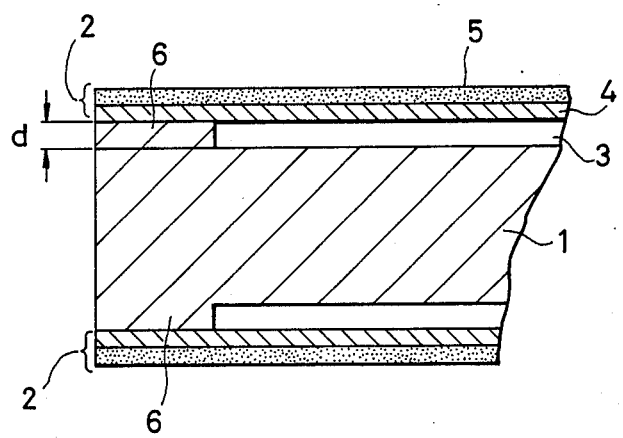
FIG. 2 is an enlarged view of the edge portion thereof.

Referring to FIGS. 1 and 2, there are shown sectional views of a magnetic disk according to the present invention. A flexible disk 2 is composed of a support 4 and an externally facing magnetic layer 5. Two such flexible disks 2 are affixed to the opposite surfaces of a base 1. The base 1 has inner and outer peripheral mounting rings 6a and 6b to which the flexible disks 2 are affixed by a layer of adhesive. As a result, gaps 3 are formed beneath the flexible disks 2 between the mounting rings 6a and 6b. In the embodiment illustrated in the drawings, the flexible disk is affixed to each of the opposite surfaces of the base 1. A center hole 7 is intended for the insertion of a rotary shaft for rotating the disk.

Materials used for so-called floppy disks can be used for the flexible disk 2 used in the present invention. Plastic films, such as a polyethylene terephthalate film, or the like, can be used for the support 4 of the flexible disk 2. Preferred examples of the plastic films include biaxially-oriented polyethylene terephthalate (PET) films. Particularly, the most preferred ones are biaxially oriented polyethylene terephthalate films in which, when magnetic layers are formed, the rate of shrinkage after heat treatment at about 70° C. for about 48 hours is not larger than 0.2% and the difference in shrinkage rate between the length and the width is not larger than 0.1%, preferably not larger than 0.05%.

The support 4 of the flexible disk 2 preferably has an average surface roughness Ra on at least the one surface on which the magnetic layer 5 is formed of no more than 0.1 micrometer. By the use of such a support 4, finished magnetic disks can maintain a high recording density. The magnetic layer 5 may be formed on the support by the application of magnetic iron oxide or ferromagnetic alloy powder together with a binder or the like, or may be formed by proper deposition methods and plating methods, such as vacuum evaporating, sputtering, ion plating, etc.

According to the present invention, for example, such a disk base having a cross-section as shown in FIGS. 1 and 2 is used.

The gap 3 is provided for the double purpose of increasing durability by dispersing frictional force when the head comes into contact with the magnetic layer 5, and of making it possible to perform high density recording by enabling the head to suitably touch the magnetic layer 5 and by making the space sufficiently narrow. To this end, it is necessary to select the depth d of the gap 3 to be not less than 0.1 mm. In addition, the gap 3 probably relates to the reduction of the influence of dust deposited on the magnetic layer 6, although the cause of this beneficial effect is unknown.

Although the case where the surfaces of the mounting rings 6a and 6b are kept horizontal is shown in FIGS. 1 and 2, the mounting rings 6a and 6b may be inclined. Further, the inner diameter of the base 1, the outer diameter of the base 1, and the size of the mounting rings 6a and 6b can be appropriately selected in accordance with the intended use.

Examples of material used for the base include metal, such as aluminum, aluminum alloy, etc., glass, synthetic resin, filler-including resin, and combination thereof.

Next, low cost is required. Aluminum is a typical metal for the base 1. In the present invention, even if an aluminum base 1 is used, the magnetic layer is not affected by the surface roughness of the base as seen in FIG. 1 so that accuracy in polishing the base 1 is not particularly required. Thus, it is possible to reduce the cost for polishing or the like.

Also, polymer bases are generally inexpensive because they can be mass-produced through injection molding. Preferably, material used for a polymer base may be a crystalline polymer having heat-proof properties or a non-crystalline polymer having a glass transition point of 80° C. or more. Such polymers are not transformed in storage at a high temperature. Typical examples of the material for such a polymer include polycarbonate, polyetherimide, polyphenylene sulfide, polysulfide, polyimide, polysulfone, polyacrylate, polyethersulfone, polyetheretherketone, etc.

Further, a metal oxide, such as $TiO_2$, $SiO_2$, etc., $BaSO_4$, glass fiber, or the like, may be added to the above-mentioned material in the proportion of 5 to 35% by weight to reduce the thermal expansion coefficient of the base.

Generally, the base in the present invention has a thickness of 1 to 5 mm and the flexible disk affixed on the base has a thickness of 10 to 100 micrometers. Since the dimensional stability of the magnetic disk is limited by that of the base, it is preferable to select a base having good dimensional stability.

Since the material generally used for the arm of the magnetic head is aluminum, it is preferable to make the thermal expansion coefficient of the base to approach the value $(2.4 \times 10^5/°C.)$ of that of aluminum and to make the hygroscopic expansion coefficient of the base material as low as possible.

The flexible disk is affixed onto the above-mentioned base. Two different types of non-solvent adhesive agents will be described, a hot melt adhesive agent and a radiation cured acryl or rubber adhesive agent.

In the first case, a hot melt adhesive agent is particularly preferable as a non-solvent type adhesive agent. There is used as the base polymer of the hot melt adhesive agent at least one kind of rubber resin, for example, polystyrene-butadiene copolymer, acrylonitrile-butadiene copolymer, polystyrene-isoprene copolymer, ethylene-butylene copolymer, polyisobutylene, polybutadiene, butyl rubber, etc. Further possibilities are polyolefin copolymers, for example, polyethylene, polypropylene, ethylene-vinyl acetate copolymer, butyl acrylate-vinyl acetate copolymer, etc. Other possibilities exist.

Examples of tackifiers added to the base polymer of the adhesive include natural resins and modifications thereof, for example, resin, polymerized resin, hydrogenated resin, resin ester, etc., aliphatic compounds, alicyclic compounds, aromatic compounds, petroleum resins, terpene resins, terpenes, phenol resins, cumaron resins, and the like. Examples of softeners used include processed oil, paraffin oil, castor oil, polybutene, polyisoprene, and the like.

In addition, if necessary, additives such as plasticizers, fillers, age resisters, ultraviolet ray checking agents, or the like, may be added to the hot melt adhesive agent to improve the heat resistance, weather resistance, etc.

The respective weight proportion of those agents described above is selected to be 100–600 parts for the tackifier and 0–100 parts for the softener, per 100 parts of the base polymer, so that the resulting mixture has a softening point not higher than 140° C., preferably not higher than 120° C., and a melt tackiness not higher than 1000 poise at 140° C., preferably not higher than 1000 poise at 160° C.

As mentioned above, radiation cured acryl or rubber adhesives may also be used. Examples of the acryl adhesive agent are:

(1) A mixture of a tackifying resin and an acryl-series monomer. There is at least one tackifying resin of 60 to 95% by weight, and at least one acryl-series monomer of 5 to 40% by weight. Examples of the tackifying resin are a natural resin and derivatives thereof, for example, rosin, polymerized rosin, hydrogenated rosin, rosin ester, etc.; an aliphatic compound, a alicyclic compound, a cumaron resin, (a butyl acrylate/vinyl acetate copolymer, an ethylene/vinyl acetate copolymer, and the like. Examples of a acryl-series monomer are acrylic acid, methacrylic acid, acrylic ester and methacrylic ester, for example, methyl acrylate, butyl acrylate, ethyl methacrylate, tetrahydrofurfuryl acrylate, ethylene glycol dimethacrylate, diethylene glycol diacrylate, triethylene glycol diacrylate, etc.

(2) Copolymerization products of acrylic acid, isooctyl acrylate, etc. (Syrup in the case that polymerization is discontinued at the polymerization degree of about 10%.).

(3) A urethane elastomer or polyester oligomer having an acryloyl group on the side chain or principal chain thereof.

(4) A composition containing 60 to 90% of the above mentioned urethane (3), 5 to 20% by weight of acryl-series monomer, 0 to 30% tackifying resin, and 0 to 20% softener.

Examples of a rubber adhesive agent include a composition prepared by dissolving a mixture of at least one rubber resin, for example, polybutadiene, acrylonitrile/- butadiene copolymer, natural rubber, styrene/butadiene rubber, etc.; at least one tackifying resin, for example, phenol terpene, hydrogenated resin, etc.; and at least one kind of acryl monomers and vinyl monomers, for example, acrylic acid, acrylic ester, methacrylic ester, vinyl acetate, etc.

If necessary, plasticizers, fillers, and the like, may be added to those acryl or rubber adhesive agents.

Grooves or holes may be formed in the bonding portion of the base to improve adhesive effects for any type of adhesive agent. The thickness of the adhesion layer is selected to be 1 to 100 micrometers, preferably 3 to 20 micrometers.

In bonding, physical surface treatment such as corona discharge, glow discharge, flame treating, or the like, may be made upon one or both of surfaces to be bonded to facilitate the adhesion.

After acryl or rubber adhesive agents are applied to the edge portion (inner and outer circumferences) of the base or applied to the flexible disk, the flexible disk is affixed to the base and irradiated with radiant rays. The hot melt adhesive agents do not require radiation curing.

Although electron beams, gamma rays, beta rays, or the like are utilized for the radiant rays in the present invention, electron beams are preferable among them. Either a scanning type and a non-scanning type electron radiation machine may be employed as the source of electron radiant rays. The acceleration voltage for the electron rays is selected to be 100 to 1000 kV, preferably 150 to 300 kV, and the absorbed dose is selected to be 0.1 to 20 Mrad, preferably 0.5 to 15 Mrad. If the acceleration voltage is lower than 100 kV, the transmitted dose of energy is insufficient, while if it exceeds 1000 kV, the energy efficiency for polymerization is wastefully reduced. If the absorbed dose is lower than 0.1 Mrad, the hardening reaction is insufficient to obtain strength of the magnetic layer, while if it exceeds 20 Mrad, the energy efficiency for hardening is reduced or the irradiated body is heated. Particularly, the plastic support of the flexible disk may be undesirably transformed.

After completion of adhesion, heat treatment may be made to remove anisotropy of the support of the flexible disk. Preferably, the temperature for the heat treatment is selected to be not lower than the glass transition point of the support of the flexible disk but not higher than 120° C., and the time for the heat treatment is set to be in a range of from 3 seconds to 24 hours in accordance with the temperature. After the heat treatment, the support is cooled to room temperature.

The present invention will be described hereinafter more in detail with reference to the following examples, but the scope of the invention is not limited to the specific embodiments.

EXAMPLES

(Preparation of Flexible Disk)

A magnetic solution containing the following components was applied to one surface of a 35 micrometer thick biaxially oriented polyethylene terephthalate film support to form a magnetic layer having a 1.5 micrometer thickness after treatment for drying and calendering. After the application, the support coated with the magnetic solution was dried and calendered to provide a above-mentioned magnetic layer, and was stamped out to obtain a doughnut-like sheet to thus prepare a flexible sheet.

| Magnetic Solution I | |
| --- | --- |
| $\gamma\text{-Fe}_2\text{O}_3$ | 300 Parts |
| PVC-Ac (vinyl chloridevinyl acetate copolymer (VYHH tradename, made by Union Carbide Corp.) | 40 Parts |
| Epoxy resin (EPICOAT 1001 tradename, made by SHELL CHEMICAL CO., LTD.) | 40 Parts |
| Polyamide (BARSAMIDE 115 tradename, made by General Mills Corp.) | 20 Parts |
| Methylisobutylketone/xylol (2/1) | 800 Parts |

On the other hand, a base of polyetherimide containing 30% glass fiber was prepared by injection molding.

The shape of the base was as shown in FIG. 1. The outer and inner diameters of the disk base were 130 mm and 40 mm, respectively. The length of the mounting rings 6a and 6b of the base was 2 mm. The thickness of the base was 2 mm, and the depth d of the gap 3 was 0.25 mm.

The above-mentioned flexible disk was affixed onto the base by using one of the following five adhesive agents. Table 1 shows the results of evaluation.

The first example uses a hot melt adhesive agent.

EXAMPLE 1

| | |
| --- | --- |
| Polyisoprene/styrene copolymer (KARIFLEX TR1101 tradename, made by SHELL CHEMICAL CO., LTD.) | 100 Parts |
| Takifier Alicyclic petroleum resin (ARCON P-70 tradename, made by ARAKAWA Chemical Industries Ltd.) | 200 parts |
| Softener: paraffin oil | 40 Parts |

The resin composition was applied to the edge portion of the base to a thickness of about 10 micrometers. Then, the flexible disk was put on the base and pressed at 200° C. for half an hour so as to affix the flexible disk to the base.

There are four examples of an acryl or rubber adhesive agent.

EXAMPLE 2

| | |
| --- | --- |
| Hydrogenated resin | 75 Parts |
| Acrylic acid | 20 Parts |
| Ethylene glycol diacrylate | 5 Parts |

The resin composition was applied to the edge portion of the base so as to form an about 10 micrometers thick layer. The flexible disk was put on the base, and then irradiated with electrons at 165 kV so as to produce and 10 Mrad.

EXAMPLE 3

Copolymerization syrup containing 30 parts of acrylic acid and 70 parts of isooctyl acrylate (Polymerization rate: 10%).

A magnetic disk was obtained in the same manner described in Example 2.

EXAMPLE 4

| | |
| --- | --- |
| Polyurethane acrylate elastomer | 70 Parts |

| | |
|---|---|
| (AroniX1100 tradename, made by TOA GOSEI Chemical Industry Co., Ltd.) | |
| Acrylic acid | 10 Parts |
| Terpene resin | 20 Parts |

A magnetic disk was obtained in the same manner described in Example 2.

EXAMPLE 5

| | |
|---|---|
| Acrylonitrile/butadiene copolymer (NIPOLE14325 tradename, made by NIPPON ZEON Co., Ltd.) | 70 Parts |
| Butyl acrylate | 20 Parts |
| Vinyl acetate | 10 Parts |

A magnetic disk was obtained in the same manner described in Example 2.

Comparative EXAMPLE 1 (Thermoplastic Epoxy Resin)

| | |
|---|---|
| Epoxy resin (EPICOAT 828 tradename, made by SHELL Chemical Corp.) | 100 Parts |
| Triethylamine | 5 Parts |

The resin composition was applied to the edge portion of the base to a thickness of about 10 micrometers. Then, the flexible disk was put on the base and left at 60° C. for 5 hours.

Comparative EXAMPLE 2 (Solvent Type)

| | |
|---|---|
| Styrene/butadiene copolymer | 100 Parts |
| Methylethylketone | 300 Parts |

The resin composition was applied to the edge portion of the base to form a 10 micrometers thick film after being dried. The resin was then dried at 100° C. for 10 seconds. Then, the flexible disk was put on the base and left at 60° C. for 5 hours.

Method of Adhesion Test

Mylar tape was stuck to the flexible disk of the respective magnetic disk, and then peeled off at 180° C. This operation was repeated 50 times, and the condition of peeling off at the edge portion was observed. The results are summarized in Table 1.

TABLE 1

| | Adhesive condition | Adhesion Time |
|---|---|---|
| Example 1 | Good adhesion | 1 second or less |
| Example 2 | Good adhesion | 1 second or less |
| Example 3 | Good adhesion | 1 second or less |
| Example 4 | Good adhesion | 1 second or less |
| Example 5 | Good adhesion | 1 second or less |
| Comparison 1 | Good adhesion | 5 hours at 60° C. |
| Comparison 2 | Edge portion was was partly peeled. | 5 hours at 60° C. |

According to the magnetic disk of the present invention, the time required for the adhesion between the base and the flexible disk is short and the adhesive property is good in all of the described examples.

What is claimed is:

1. A magnetic disc comprising:
 a base including a recess formed between a mounting ring and a surface of said base;
 a flexible non-magnetic sheet support;
 a magnetic layer formed on a first surface of said support; and
 a non-solvent, hot melt adhesive agent bonding a second surface of said support to said mounting ring to form a gap of not less than 0.1 mm between said support and said base in a region of said recess.

2. A magnetic disk as recited in claim 1, wherein said non-solvent adhesive comprises a rubber resin.

3. A magnetic disk as recited in claim 2, wherein said rubber resin is one member selected from the group consisting of polystyrene-butadiene copolymer, acrylonitrile-butadiene copolymer, polystyrene-isoprene copolymer, ethylene-butylene copolymer, polyisobutylene, polybutadiene, butyl rubber and a polyolefin copolymer.

4. A magnetic disc comprising:
 a base including a recess formed between a mounting ring and a surface of said base;
 a flexible non-magnetic sheet support;
 a magnetic layer formed on a first surface of said support; and
 a non-solvent radiation cured acryl adhesive agent formed from a composition comprising an acryl monomer and a tackifying resin bonding a second surface of said support to said mounting ring to form a gap of not less than 0.1 mm between said support and said base in a region of said recess.

5. A magnetic disk as recited in claim 4, wherein said acryl adhesive agent is formed from a composition comprising an acryl-series monomer of 5 to 20% by weight, a tackifying resin of up to 30% by weight and an urethane elastomer or a polyester oligomer of 60 to 90% by weight.

6. A magnetic disk as recited in claim 4, wherein said acryl adhesive agent is formed from a composition comprising a material selected from the group consisting of acrylic acid, methacrylic acid, acrylic ester and methacrylic ester.

7. A magnetic disk as recited in claim 4, wherein said acryl adhesive agent is a copolymerization product of acrylic acid or isooctyl acrylate.

8. A magnetic disk as recited in claim 4, wherein said acryl adhesive agent is formed from a composition of an urethane elastomer or a polyester oligomer having an acryloyl group.

9. A magnetic disk as recited in claim 4, wherein said acryl adhesive agent is formed from a composition comprising a urethane elastomer of 60 to 90% by weight, an acryl series monomer of 5 to 20% by weight, a tackifying resin of up to 30% by weight and a softener of up to 20% by weight.

10. A magnetic disc as recited in claim 4, wherein tackifying resin is selected from the group consisting of rosin, polymerized rosin, hydrogenated rosin, rosin ester, an aliphatic compound, an alicyclic compound, a petroleum resin, a terpene resin, a terpene, a phenol resin and a cumaron resin.

11. A magnetic disc comprising:
 a base including a recess formed between a mounting ring and a surface of said base;
 a flexible non-magnetic sheet support;
 a magnetic layer formed on a first surface of said support; and
 a non-solvent radiation cured rubber adhesive agent comprising a rubber resin selected from the group consisting of polybutadiene, acrylonitrile/butadiene copolymer, natural rubber and styrene/butadiene rubber, said agent bonding a second surface of said support to said mounting ring to form a gap of not less than 0.1 mm between said support and said base in a region of said recess.

12. A magnetic disk as recited in claim 11, wherein said composition further comprises a tackifying resin and one of an acryl monomer and a vinyl monomer.

13. A magnetic disk as recited in any one of claims 4 or 11, wherein the radiation is electron beams.

* * * * *